July 21, 1970      T. T. ALLEN      3,521,396
MULTIPURPOSE HANDTOOL FOR FISHERMEN
Filed Sept. 4, 1968
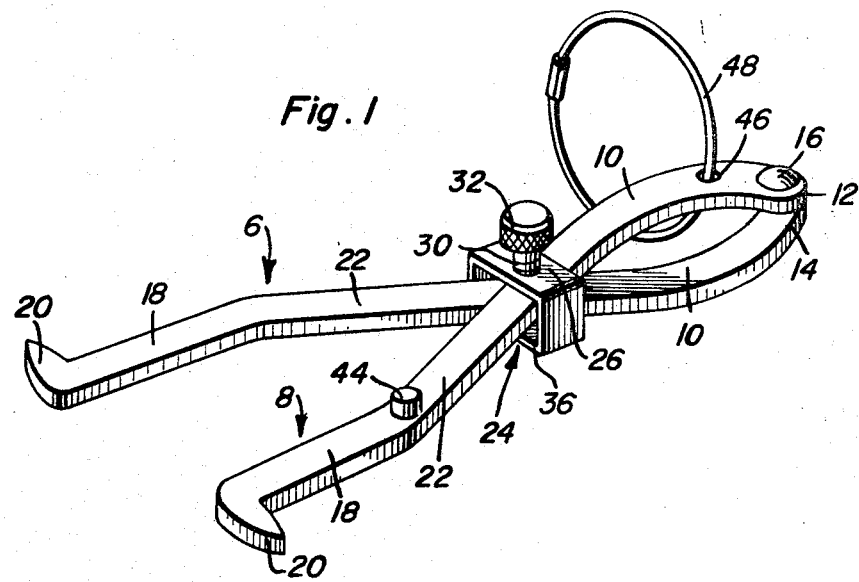
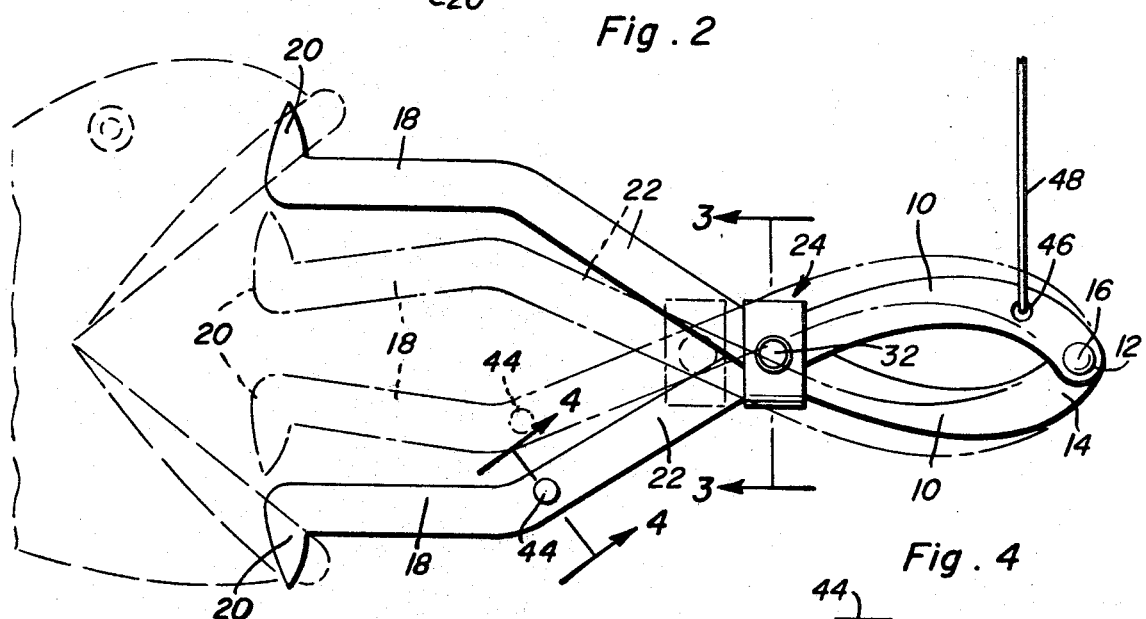
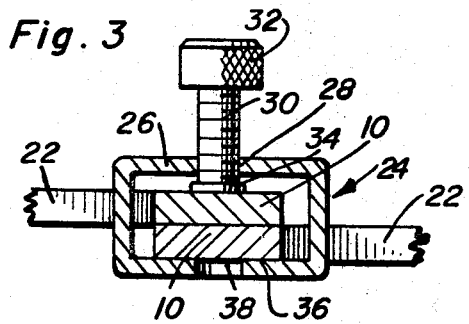
Terry T. Allen
INVENTOR.
BY *Clarence A. O'Brien*
*and Harvey B. Jacobson*
Attorneys

United States Patent Office 3,521,396
Patented July 21, 1970

3,521,396
MULTIPURPOSE HANDTOOL FOR FISHERMEN
Terry T. Allen, 202 Harrison Ave.,
Henderson, N.C. 27536
Filed Sept. 4, 1968, Ser. No. 757,418
Int. Cl. A01k *97/00*
U.S. Cl. 43—53.5                                9 Claims

ABSTRACT OF THE DISCLOSURE

A manually manipulable tool for spreading open the mouth of a fish to remove a fishhook comprising a pair of identical lever units pivotally secured together at one end. The units are bowed outwardly from the pivot to provide hand gripping portions, then cross over each other to straight, substantially-parallel outer end portions which terminate in outwardly-extending fish jaw impaling members. A collar slidably encompasses the lever units where they cross each other and is adjustable on the units to provide a retainer therefor.

---

This invention relates to a structurally and functionally novel handtool which lends itself to practical multipurpose use by fishermen and pertains, more particularly, to a pliers-like adaptation which is characterized by a pair of crossed duplicate levers whose crossed portions are free of positive mechanical connection and whose inward end portions are overlapped and pivotally joined to each other.

Persons conversant with the field of invention herein under advisement are doubtless conversant with the fact that fish handling and holding tools and implements have been expressly devised to enable an angler to spread the mouth of a fish without the danger of being bitten by the fish or without running the risk of injury to the hands or body when removing the fishhook. As a matter of fact, tongs-type implements and pliers-like tools have been devised for fish handling purposes. One example is shown in a patent for a fish mouth spreader in the patent to Kirsch, 1,952,990.

An object of the present invention, broadly stated, is to improve upon prior art fishermen's handling tools and, in doing so, to advance the art and to provide a tool which is implemented by such facilities as well as serve the over-all needs of landing and handling a hooked fish.

Briefly, the tool herein disclosed comprises a pair of elongated duplicate bars each bar constituting that which is herein described as a lever unit or member. The lever units have straight outer end portions which terminate in outstanding fish jaw impaling members, have longitudinally bowed inner end hand-gripped and squeezable portions and intervening median converging portions which are overlapped and crossed but are free of positive mechanical connection. The inner end portions are curved or toed-in toward each other, overlapped and pivotally joined. A manually manipulable and regulable collar encompasses and is shiftable on the companion lever units. This collar is adjustable and cooperable with the longitudinally-bowed inner end portions and the converging portions and serves as a retainer. The collar is provided with a setscrew with a readily-accessible thumb grip and the shank of the setscrew is operatively engageable with at least one of said units in a manner to clampingly bind the collar in a given retaining position.

Experience in the use of the tool shown has repeatedly revealed that it enables the user to controllably handle a jumping and jerking fish frequently without actually touching the fish and enables the fisherman to cope with a wriggling fish and with fish having difficult-to-handle teeth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view of a multipurpose hand tool for fishermen constructed in accordance with the invention and showing the component parts and the manner in which they are constructed and cooperate for advantageous results.

FIG. 2 is a top plan view of the tool showing the lever units spread apart with the pointed grips functioning to impale and hold the fish and with these same parts appearing in phantom lines when drawn together.

FIG. 3 is an enlarged detail view with parts in elevation taken approximately on the plane of the line 3—3 of FIG. 2.

And FIG. 4 is an enlarged cross-section taken on the section line 4—4 of FIG. 2.

With reference in particular to FIGS. 1 and 2, the two lever units are denoted by the numerals 6 and 8, respectively. These lever units are of duplicate design and construction and each unit takes the form of a suitably elongated bar, that is, a bar which is substantially rectangular in cross-section as brought out with particularity in FIG. 3. The aforementioned corresponding inner end portions are longitudinally bowed as at 10 and have terminal end portions 12 and 14 which are toed-in toward each other, are overlapped and pivotally jonied by a rivet or an equivalent pivotal connection 16. The outer free end potrions are straight and in general parallel relationship and are denoted at 18 and have outstanding pointed fish jaw impaling and tool retaining members 20. The median or intermediate portions are denoted at 22 and are disposed in converging relationship. The converging portions provide a crotch at the juncture of the portions 10 and 22. It is this junctional portion which serves to accommodate the clamping and retaining collar 24. This collar is of flat-faced band construction and is rectangular in edge elevation as shown to advantage in FIGS. 1 and 3. An upper or top portion of the band is denoted at 26 and is provided with a screw-threaded hole 28 through which the shank 30 of a setscrew is threaded to engage the lever units and hold the collar adjustably in place thereon. The upper end of the shank is provided with a finger grip which is knurled and denoted at 32. This finger grip can be round or flat (not shown) as desired. The inner end portion of the shank at 34 is deformed or peened so that it will be retained in place and against accidental displacement. To the ends desired it has been found practical to provide a hole of suitable diameter in the lower part 36 of the collar. This hole is denoted at 38 and is in line with the hole 28. In actual practice, a suitable punch or other implement is passed through this hole and is hammered against the shank to provide the enlargement 34 which serves, in an obvious manner, to retain the setscrew in place.

In practice, when the collar is placed around the coacting portions 10 and 22 it can be shifted back and forth to assume either a free position or a locked position as the case may be.

One of the lever units is provided, as shown in FIG. 4, with a screw-threaded hole 40 to accommodate a screw-threaded shank 42 on a headed screw 44 which provides a limit stop. This limit stop prevents accidental displacement of the shiftable collar.

One of the curvate end portions 10 is provided with a hole as at 46 to accommodate a ring or the like 48 which serves to assist the user in holding the tool when using it. This may be a strap or ring and may be employed as a hand ring or a wrist ring as the case may be.

All of the component parts are shown clearly in FIG. 1 and will be fully understood when taken in conjunction with the other figures, particularly FIGS. 3 and 4. The manner in which the tool or implement is applied and used is shown in full dotted lines in FIG. 2. Accordingly, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A landing, fishmouth spreading and fishhook handling tool comprising a pair of duplicate lever units having straight outer end portions terminating in outstanding fish jaw impaling members, having longitudinally bowed inner end hand embracing and gripping portions toed in toward each other, overlapped and pivotally joined, and also having median converging portions which are also overlapped and crossed over each other but are free of positive mechanical connection, and a manually manipulable and regulable collar encompassing and shiftable on said lever units, said collar being adjustable and cooperable with said longitudinally bowed inner end portions and the crotch of said median converging portions and providing a retainer.

2. The tool defined in and according to claim 1, and wherein said collar is provided with a setscrew having a readily accessible thumb-grip and which is operatively engageable with at least one of said units in a manner to clampingly bind said collar in a given retaining position.

3. The tool defined in and according to claim 2, and wherein each lever unit comprises an elongated rigid bar which is substantially rectangular in cross-section, the overlapping portions of said bars being flat and having mating contact in a manner to provide unhampered coaction and relative movement and adjustment of said bars.

4. The tool defined in and according to claim 3, and wherein said collar comprises an endless flat-faced band rectangular in edge elevation and proportional in size with the portions of the bars which are surrounded thereby.

5. The tool defined in and according to claim 1, and, in combination, a wrist encircling element freely pivotally mounted on and connected with one of said inner end portions and which aids in handling and controlling the over-all tool, particularly when it is employed as a fish holder when scaling a fish.

6. A fish landing fishmouth spreading and fish handling tool comprising a pair of duplicate elongated bars constituting companion lever units and having sraight outer end portions terminating in outstanding fish jaw impaling members, having longitudinally bowed inner end hand embracing and gripping portions toed in toward each other, overlapping and pivotally joined, and also having median converging portions which are also overlapped and crossed over each other but are free of positive mechanical connection, and a manually manipulable and regulable collar encompassing and shiftable on said lever units, said collar being adjustable and cooperable with said longitudinally bowed inner end portions and crotch of said median converging portion and providing a retainer, said collar comprising an endless flat-faced band rectangular in edge elevation and surrounding the portions of the bars which are encircled thereby, certain flat portions of said band having firm but shiftable contact with oriented flat portions of said bars.

7. The tool defined in and according to claim 6, and wherein said collar is provided with a setscrew having a readily accessible thumb-grip and which is operatively engageable with at least one of said units in a manner to clampingly bind said collar in a given retaining position.

8. The fish landing and handling tool defined in and according to claim 7, and wherein at least one of said bars has an outward portion provided with an outstanding stop screw which serves as a limit stop and guards against accidental displacement of said collar via the outer end portions and median portions of said bars.

9. The tool defined in and according to claim 8, and, in combination, a wrist encircling element freely pivotally mounted on and connected with one of said inner end portions and which aids in handling and controlling the over-all tool, particularly when it is employed as a fish holder when scaling a fish.

References Cited

UNITED STATES PATENTS

| | | | |
|---|---|---|---|
| 1,025,362 | 5/1912 | Beuoy | 43—53.5 X |
| 1,879,161 | 9/1932 | Frambach et al. | 43—53.5 |
| 1,952,990 | 3/1934 | Kirsch | 43—53.5 |
| 2,531,522 | 11/1950 | Malouf | 43—53.5 |
| 2,717,592 | 9/1955 | Swinehart | 128—17 |

SAMUEL KOREN, Primary Examiner

D. J. LEACH, Assistant Examiner

U.S. Cl. X.R.

128—17